United States Patent [19]

Spors

[11] 4,185,126
[45] Jan. 22, 1980

[54] PROCESS OF RECONSTITUTING CHEESE TRIMMINGS INTO HORNS

[75] Inventor: Rodney D. Spors, Bristol, Ind.

[73] Assignee: Beatrice Foods Co., Chicago, Ill.

[21] Appl. No.: 938,899

[22] Filed: Sep. 1, 1978

Related U.S. Application Data

[63] Continuation-in-part of Ser. No. 850,683, Nov. 11, 1977, abandoned.

[51] Int. Cl.² ............................................. A23C 19/02
[52] U.S. Cl. ................................. 426/512; 426/272; 426/518; 426/524
[58] Field of Search ............... 426/272, 582, 388, 454, 426/512, 516, 517, 518, 524; 99/483, 537, 465, 466, 455; 425/84, 197, 202; 241/82.5

[56] References Cited

U.S. PATENT DOCUMENTS

| | | | |
|---|---|---|---|
| 2,572,833 | 10/1951 | Balzarini | 426/516 X |
| 3,421,220 | 1/1969 | Stanga | 426/516 X |
| 3,543,403 | 12/1970 | Speglic et al. | 426/582 X |
| 3,727,308 | 4/1973 | Ross | 426/388 X |
| 3,741,774 | 6/1973 | Burkwall | 426/582 |
| 3,961,077 | 6/1976 | Kielsmeier | 426/582 X |
| 4,039,695 | 8/1977 | Johnson | 426/454 X |

Primary Examiner—Arthur L. Corbin
Attorney, Agent, or Firm—Gust, Irish, Jeffers & Rickert

[57] ABSTRACT

Cheese trimmings are reconstituted into horns by grinding the trimmings into a particulate mass at a temperature which inhibits bacteria growth on said trimmings and then, at said temperature, ramming the particulate mass into a closed mold at a pressure and for a period of time as causes the particles in said mass to completely bond together to form a solid, self-supporting block of cheese.

14 Claims, 7 Drawing Figures

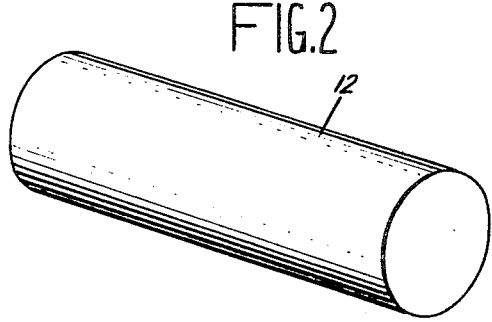
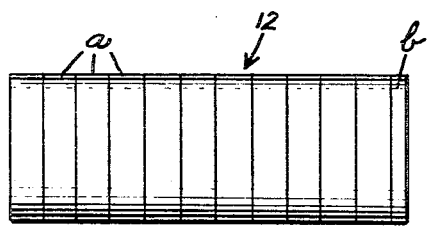
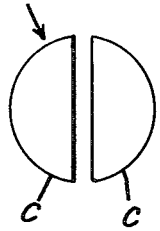
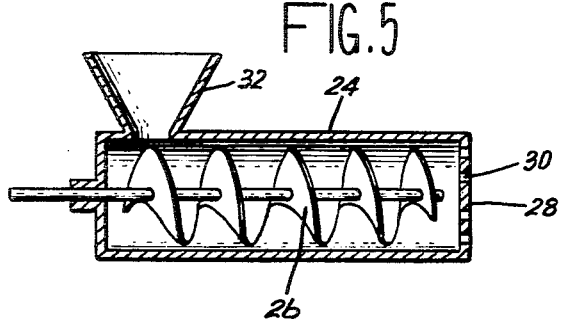
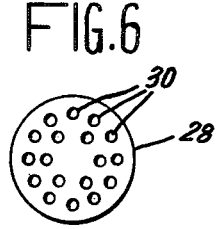
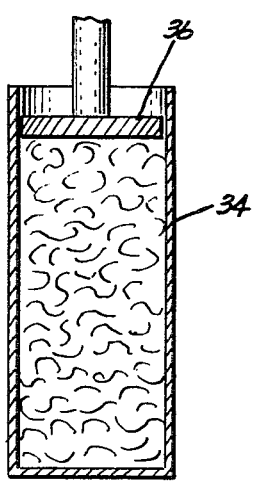

PROCESS OF RECONSTITUTING CHEESE TRIMMINGS INTO HORNS

This is a continuation-in-part application of Application Ser. No. 850,683, filed Nov. 11, 1977, now abandoned.

BACKGROUND OF THE INVENTION

1. Field of the Invention

The present invention relates to the manufacture of cheese in block form and more particularly to the reconstituting of block cheese trimmings into horns which may be sliced and packaged for the consumer market.

2. Description of the Prior Art

In the manufacture of block cheese, such as swiss and colby, "hoops" are conventionally filled with curds which are compressed therein to form blocks or horns as the case may be. The hoops are frusto-conically shaped, serving as molds, which facilitate removing the horn after the cheese is cured therein. The contents of the hoops are maintained under compacting pressure from about three to four hours following which the solidified blocks or horns are removed from the hoops and then stored in plastic bags for about six weeks at refrigerated temperatures before further processing and packaging.

The temperature of the curd material at the time of filling the hoops is in the vicinity of 90° F. The compacting pressure ranges in the vicinity of from about seventy to ninety pounds per square inch.

After the period of six weeks cure, the colby horns are transversely sliced and halved to provide semi-circular segments of predetermined size and weight. These segments are then wrapped, labeled and placed in containers for shipment to sales outlets.

Frequently, the horns not being of uniform length, the end cuts or slices being too thin for packaging are cut into smaller pieces and placed in reject containers for disposal. Some of this reject material is utilized for making pasteurized processed cheese spread, but in any event these rejects represent an economic loss, since the sales price thereof is below that of the prime product sold in the consumer packages.

In the past, block cheese has been fabricated by first grinding preprocessed cheese and then forcing the ground mass through an extruding chamber having an orifice of a predetermined cross-sectional shape and size. The cheese emerged from the extruding die in the form of a strip which was continuously laid onto a sheet of wax paper for transporting to a cooling atmosphere such as that inside a refrigerator. After a sufficient perid of cooling, the cheese was cut into squares or blocks of a size that could be conveniently packaged.

SUMMARY OF THE INVENTION

The present invention relates to a process for reconstituting cheese trimmings into horns, such trimmings being the residue which results from cutting a premanufactured horn into packageable slices. The steps include establishing the temperature of the trimmings in the range from about 42° F. to about 55° F., grinding the trimmings into a particulate mass, then at the aforesaid temperature, compacting the particulate mass into a mold at a pressure and for a period of time as causes the particles in the mass to bond together to form a solidified, self-supporting block or horn of cheese having an appearance, texture and flavor substantially the same as the prime product from which the trimmings were obtained.

More particularly, this cheese is of the swiss or colby type with the compacting step being performed under a pressure of from about sixty to ninety pounds per square inch gauge for a period of time of from about two hours to one hour, respectively, depending upon the room temperature. In any event, the temperature at which the material is maintained during processing, as well as the compacting pressure and duration of compacting, is such that the ground particles bond together into a cohesive mass such that the resulting horn has substantially the same physical, chemical and taste properties of the prime product.

It is therefore an object of this invention to provide a process for reconstituting cheese trimmings into horns of cheese which may be sliced and packaged in essentially the same form as the prime product.

It is another object of this invention to provide a process for reconstituting cheese trimmings into horns of cheese which have essentially the same physical, chemical and taste properties as the prime product.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 2 is a perspective view of a typical horn of cheese;

FIG. 3 is a side view thereof but transversely sliced;

FIG. 4 is a front view of one of the slices halved to provide semi-circular segments;

FIG. 5 is a diagrammatic illustration of a typical grinder used in grinding cheese trimmings;

FIG. 6 is an end view of the perforated head from which the cheese mass in particulate form is forced; and FIG. 7 is a longitudinal sectional view of a typical hoop and ram into which cheese particles are compacted to form a horn.

DESCRIPTION OF THE PREFERRED EMBODIMENT

Figure 1:
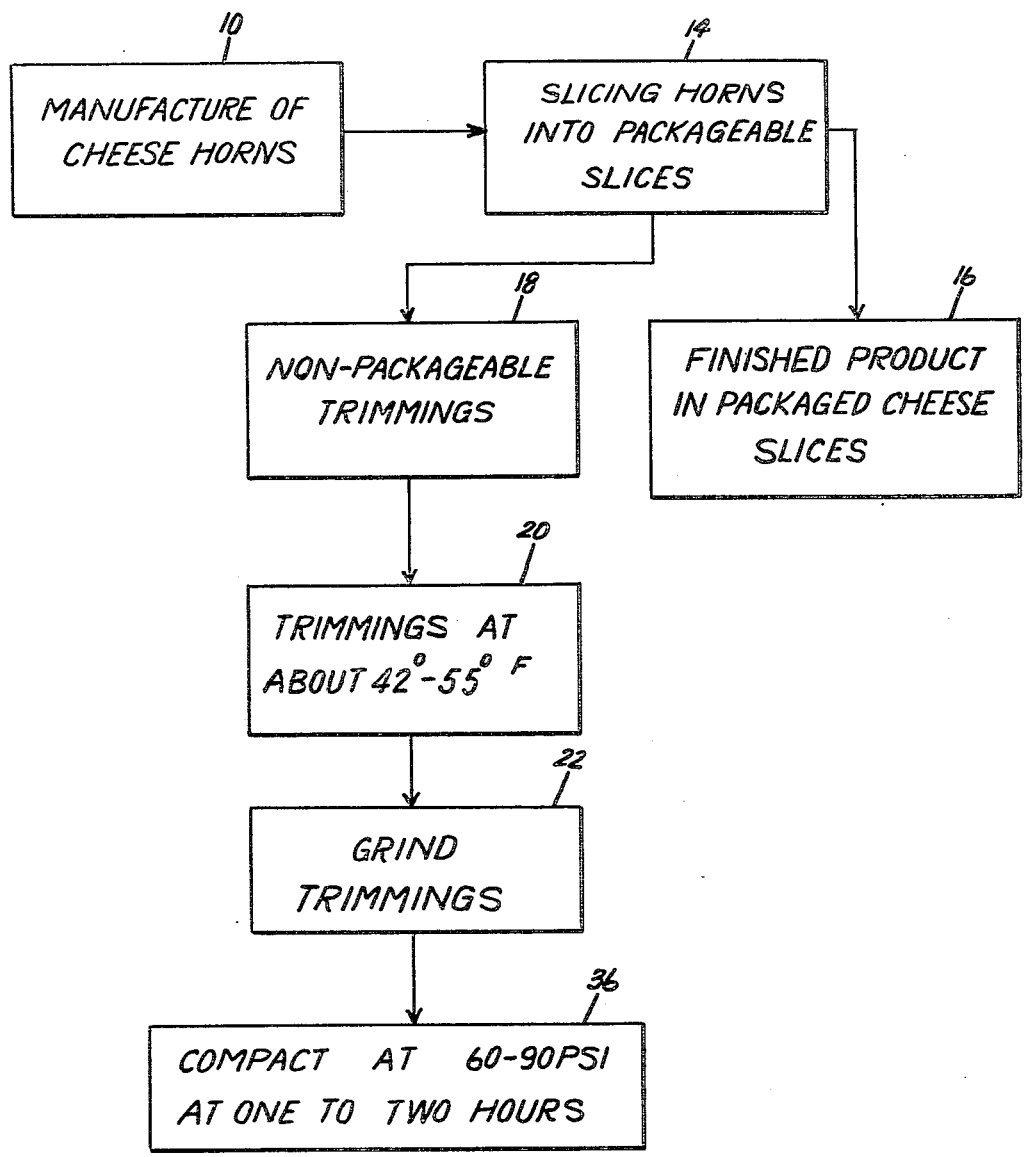
FIG. 1 is a flow diagram used in explaining the principles of this invention.

Referring to the drawings, and more particularly to FIG. 1, the process of this invention will be generally described. Since this invention has particular utility in connection with the processing of both swiss and colby cheeses, especially mild colby cheese, the description of a preferred embodiment will be particularly directed to these. In the manufacture of the prime cheese product, conventional processing steps and equipment are used. The equipment includes containers, termed as "hoops", which are filled with raw, cheese-forming material (curds) compressed therein to form cylindrical but slightly tapered blocks or horns. The hoops themselves, of stainless steel, are frusto-conically shaped so as to facilitate removal of the compacted mass of cheese therefrom at the appropriate time in the process. The contents are maintained compressed for a period of time, such as three or four hours. The horns are removed from the hoops, placed in plastic bags and then stored in a refrigerated atmosphere at a suitable temperature for about six weeks. After this period of time, the cheese is considered to be cured. Thereafter, the horns are removed from the bags, sliced and then packaged.

The temperature of the curds at the time of filling the hoops is about 85° F. to 90° F. The compacting pressure maintained for the three to four hour period is in the range of from about seventy to ninety pounds per square inch. The processing described thus far is indicated by the block 10 in FIG. 1 which results in the production of a horn 12 as shown in FIG. 2.

The block 14 in FIG. 1 illustrates the step in the process of slicing the horn into packageable segments prior to packaging. This is more particularly shown in FIG. 3 wherein the horn 12 is shown as having been cut into slices "a" by means of conventional slicing equipment, not shown. The slices "a" are of substantially the same thickness, but as will be noted, the end most slice "b" is thinner than the others by reason of the shortness of the horn 12. All of the slices "a" are halved as shown in FIG. 4 to provide semi-circular blocks "c" which are in readiness for packaging.

Again referring to FIG. 1, the block 16 is illustrative of the step of the segments "c" being packaged in readiness for shipment to sales outlets.

The processing block 18 of FIG. 1 indicates the beginning point of the process of this invention which deals with the leftover portion of the horn 12 represented by the slice "b". The slice "b", being to small for packaging, is cut into small chunks varying from one inch in thickness to one, two and three inches in length, and discarded into a reject barrel. These reject pieces are termed "trimmings" in the art and are prime product insofar as the physical, chemical and taste properties are concerned. In the past, three trimmings have been used for various purposes, one being to produce pasteurized processed cheese spread, another being for sale as pieces in bulk. The price at which these trimmings can be ultimately sold has never equaled that of the prime product already described.

Referring again to FIG. 1, the next step in the process of this invention is represented by the block 20 wherein the trimmings are held at or refrigerated to a temperature in the range of about 42° F. to 55° F., the ambient room temperature at which the slicing and packaging occurs and the trimmings produced being at about 70° F. These trimmings, after cooling, are next ground as indicated by the numeral 22 in FIG. 1 by means of a grinder in the form of an extruder shown in FIGS. 5 and 6. The grinder is of conventional construction including an elongated chamber 24 which receives an auger type feeder 26 rotatably supported therein. At the end of the chamber 24 is mounted a header plate 28 having a multiplicity of apertures 30 as shown more clearly in FIG. 6. A funnel shaped hopper 32 mounts on the chamber 24 at the rear end, opening into the interior thereof. The trimmings previously described are fed into the chamber 24 via the hopper 32 while the auger 26 is being rotated by means of a suitable electric motor and gear box (not shown) such that the trimmings are broken or reduced into small pieces and eventually forced through the apertures 30 in the header plate 28. Typically, the apertures 30 have a diameter of 9/16 or ¼ inch, but the size may vary to an extent as later explained. This so-called grinding is performed with the trimmings being at a temperature in the range of from about 42° F. to 55° F., the particular temperature being as later explained.

The particulate mass that emerges from the grinder of FIG. 5 is then directly conveyed to a conventional hoop 34 (FIG. 7) and there compacted, at essentially the temperature of the mass as it emerges to complete the final processing step indicated in FIG. 1 by the numeral 36. Preferably, the hoop 34 is filled about half full of the particulate mass. With the temperature of the mass at about 50° F., for example, it is momentarily compacted by means of a conventional ram indicated by the numeral 37 with as much force as can be manually exerted by an average male human. This results in a reduction in volume and some compaction of the mass. The ram is withdrawn and the hoop 34 is then immediately filled with more of the same particulate material. The mass is then compacted by means of the ram at a pressure of from sixty to ninety pounds or somewhat higher per square inch for a period of time ranging from about two to one hours, respectively. Following this compacting step, the resultant horn may be removed from the hoop and sliced and packaged as above described.

Trimmings have exterior surfaces which, during the handling of the horns for the purpose of slicing, are touched by workers' hands and exposed to the atmosphere. Even under the cleanest conditions, such surfaces tend to become contaminated to a slight extent which can promote bacteria growth. Maintaining the cheese at relatively low temperatures inhibits such growth. In the process according to this invention, the trimmings need to be cooled to a relatively low temperature in the range specified, and at or near this temperature ground and compacted, the low temperature inhibiting bacteria growth.

At low temperatures, however, bonding becomes somewhat more difficult to achieve; so in this regard higher temperatures are preferred. Since the optimum temperatures for inhibiting bacteria and facilitating bonding tend to be incongruous, it is necessary to select a temperature which is suitable for both, viz. a temperature in said range of 42° F. to 55° F.

The compacting step performed at sixty pounds per square inch usually requires that the compacting pressure be maintained for a period of about two hours. The period may be longer, but as will appear from the explanation given later, it is not always required to make the product. For the ninety pound pressure, the compacting time need be only about one to one and one-half hours. The compacting time may be longer, especially with a lower ambient room and cheese temperature.

It is necessary that the temperature, pressure, grinding, time of compacting and the particle size be so controlled that the cheese particles will bond together into an integrated mass which takes the form of the horn. By bonding is meant that when the finally compacted block is sliced and the slice is manually broken apart into pieces or chunks, these will be of sizes and shapes unlike those of the cheese particles, the latter having lost their identity as such in the block. Stated otherwise, when the slice is broken, the pieces or chunks will not be in the form of the particles, but will conform to those broken from a slice of the prime product. If the compacting pressure, time or temperature is too low, or the particle size too large, it is possible for some but not all of the cheese particles to bond together. Satisfactory bonding has been obtained at pressures, as before stated, of from sixty to ninety pounds per square inch for compacting times between two and one hours, respectively, for the temperatures and particle sizes prescribed, but the actual parameters required are determined by trial and error until particle bonding has been achieved. Reasonably higher pressures and shorter times may be used.

Compacting pressures of, for example, 115 pounds per square inch for compacting times of fifteen, thirty and forty-five minutes for mild colby cheese of a particle size emerging from apertures 30 of about nine-sixteenths inch at temperatures of from 48° F. to 50° F. have been found not to produce an acceptable product for the reason that the cheese particles were not completely bonded at the bottom of the hoop. For a one hour compacting time at 135 pounds per square inch, the particle bonding was complete and an acceptable product produced.

Compacting pressures below sixty pounds per square inch gauge, such as fifty pounds per square inch for thirty and forty-five minutes, respectively, were found not to produce acceptable particle bonding. Similarly, at sixty pounds per square inch, for thirty minutes, fair bonding of the particles were obtained but the final product was not considered to be acceptable from the standpoint of texture and firmness. For the same pressure and a compacting time of 1¼ hours, the bonding again was found to be fair and the product close to being acceptable for marketing. As stated previously, two hours compacting time at this pressure was found to produce good particle bonding: slightly oiling off of butterfat was observed but this was not enough to impair product quality.

In the aforesaid examples, the particles were produced by apertures 30 of nine-sixteenths and one-quarter inch. For the 115 and 135 psi examples, aperture sizes of nine-sixteenths and one-quarter inch were used. Particles obtained from apertures 30 of nine-sixteenths inch diameter, at temperatures of from 48° F. to 53° F., rammed at pressures of from about 60 psi for two hours to 135 psi for one hour and in quantities of about twelve and one-half pounds, resulted in satisfactory bonding. Particles obtained from apertures 30 of one-quarter inch in diameter, at temperatures of from 42° F. to 53° F., rammed at pressures of from about 70 to 135 pounds per square inch for one and one-half hours and in quantities of about twelve and one-half pounds also resulted in satisfactory bonding. For particle sizes that are too large, satisfactory bonding cannot be achieved at the pressures, times and temperatures noted, it being determined that the nine-sixteenths size is about the upper limit. Smaller sizes than nine-sixteenths inch can be used, the actual size being that at which bonding is achieved.

The quantities of cheese rammed varied from about nine and one-half to thirteen and one-half pounds, twelve and one-half pounds being found to be quite suitable, these amounts being rammed in hoops of a size given hereinafter. While particular processing parameters for mild colby and swiss cheese have been given, it will be understood by persons skilled in the art that other cheeses may be utilized following the same general steps in this process as described to produce a final product with all cheese particles properly bonded, which steps could in particular deviate to a small extent from the particular temperatures, pressures, particle sizes and times specified. Also, it would appear that while specific processing parameters have been prescribed, the ultimate objective is to cause the cheese particles to bond together in such manner that the resultant product will be a horn which is substantially identical in physical, chemical and taste properties as the prime product first described. The horn produced from the trimmings in accordance with this invention is sliced and packaged the same as previously described in connection with the prime product. The texture of this reconstituted cheese, especially the colby, is substantially identical to that of the prime product, having some very small but noticeable pores, but tending to be slightly less porous. The taste is substantially the same, there being little or no difference in chemical properties. For prime swiss cheese having large pores, the reconstituted form will be much less porous.

By reason of the relatively high quality of this reconstituted product, it can command a price commensurate with that of the prime product. In view of the fact that this price is higher than the scrap price for the reject pieces or trimmings, and since this invention utilizes essentially standard and conventional pieces of equipment for carrying out the process, an economy is at once realized.

The pressing or compacting equipment used may be that as sold by Kusel Equipment Co., Watertown, Wisconsin, referred to as Model LHV5-60. The conventional hoops 34 used were of stainless steel having an inside top diameter of six and one-half (6½) inches, a bottom diameter of five and one-half (5½) inches and a length of fifteen and one-quarter (15¼) inches. The grinder used was a Reitz Extructor, Model RE-10-KSE427. This particular grinder model is used with the extruding head removed, only the perforated plate or screen 28 remaining. The size of the apertures 30 used are about nine-sixteenths or one-quarter inch in diameter, and the cheese particles emerging therefrom are from about one-half (½) to five (5) inches in length. The feed rate of cheese trimmings to the grinder 24 actually used was about 80 pounds in two to three minutes, for a chamber size of 9-13/16 inches inside diameter and 26 inches in length. The perforated plate 28 had 429 apertures 30 and was ⅛ inch thick.

While the step of "grinding" and the use of a "grinder" is specified, these terms are to be construed in the light of the equipment used and the resulting action on the cheese trimmings that are reduced to the particle size described, the grinder disclosed being an extruder which extrudes the trimmings through the apertures 30. The particulate mass referred to is that which emerges from the plate 28 and is immediately used in the compacting step. Equipment which produces a similar particulate mass capable of being bonded into solidified form as described may also be used without departing from the spirit and scope of this invention.

While the temperature of the trimmings and particulate mass has been described as being in the range of from 42° F. to 55° F., it is to be understood that some variation from this is possible, so long as the bacteria count is kept within limits and particle bonding is possible. Forty-two degrees for swiss cheese has been found to produce satisfactory bonding. However, for temperatures which are too high, the finally compacted product is unsuitable, in some instances this being due to inadequate particle bonding, too high density, excessive bacteria content, and the appearance of large cracks in the final product.

Of importance is the fact that no processing is required of the particulate mass between the time it emerges from the grinder 24 and the compacting step 36. By proper control of the parameters described, a final product closely approximating the original can be achieved.

The colby cheese actually used had, by volume, a moisture content in the range of about thirty-eight to about forty percent and a fat content of about thirty to about thirty-two percent. The swiss cheese had, by volume, a moisture content of about thirty-seven to about thirty-nine percent and a fat content of about thirty to thirty-two percent.

While there have been described above the principles of this invention in connection with specific apparatus, it is to be clearly understood that this description is made only by way of example and not as a limitation to the scope of the invention.

What is claimed is:

1. A process for reconstituting cheese trimmings into horns, such trimmings being the residue which results from cutting a pre-manufactured horn into packageable slices comprising the steps of:
   (a) establishing the temperature of said trimmings in the range from about 42° F. to about 55° F. to inhibit bacteria growth on said trimmings,
   (b) grinding said trimmings at about said temperature into a particulate mass of particles not greater than about nine-sixteenths inch in diameter and from about one-half to about five inches in length, and
   (c) at about said temperature, ramming said particulate mass into a closed mold at a pressure and for a period of time as causes the particles in said mass to completely bond together to form a solidified, self-supporting block of cheese in said mold which is substantially like the pre-manufactured horn and in which bacteria growth is inhibited.

2. The process of claim 1 wherein said ramming step is performed under a pressure of from about sixty to one hundred thirty-five pounds per square inch gauge for a period of time of from about two hours to one hour, respectively.

3. The process of claim 2 wherein said trimmings are either swiss or colby cheese.

4. The process of claim 1 wherein said mold is of stainless steel, frusto-conically shaped, about six inches in diameter and about fifteen inches long.

5. The process of claim 4 wherein about twelve and one-half pounds of particulate mass is rammed into said mold.

6. The process of claim 1 wherein the grinding is performed in a grinder of the type having an auger into which the trimmings are fed and a perforated plate having a multiplicity of apertures through which the auger forces the cheese and from which the particulate mass emerges.

7. The process of claim 6 including conveying said particulate mass in measured quantities into said mold substantially to fill the same, inserting a ram into the end of said mold and forcing said ram toward the opposite end of said mold thereby compacting said mass.

8. The process of claim 7 wherein said trimmings are either swiss or colby cheese.

9. The process of claim 7 wherein said ramming is performed in two stages by introducing into said mold a first predetermined amount of said particulate mass and ramming it manually to an extent that causes a reduction in volume and then introducing into said mold a second predetermined amount of said particulate mass followed by said ramming at said pressure for said period of time.

10. The process of claim 6 wherein said cheese is colby, and said trimmings are fed to said auger at the rate of about eighty pounds in about two to three minutes.

11. A process for reconstituting cheese trimmings into horns, such trimmings being the residue which results from cutting a pre-manufactured horn into packageable slices comprising the steps of:
   (a) establishing the temperature of said trimmings at a level lower than about 55° F. to inhibit bacteria growth on said trimmings,
   (b) grinding said trimmings at about said temperature into a mass of particles of not larger than about nine-sixteenths inch diameter and about one-half to five inches in length, and
   (c) at about said temperature, ramming said particulate mass into a closed mold at a pressure above about sixty pounds per square inch and for a period of time of about two hours,
   said temperature, particle size, pressure and time being of such values as causes the particles in said mass to bond together to form a solidified, self-supporting block of cheese in said mold which is substantially like the pre-manufactured horn and in which bacteria growth is inhibited.

12. The process of claim 11 wherein said cheese is either colby or swiss.

13. The process of claim 11 wherein the grinding is performed in a grinder of the type having an auger into which the trimmings are fed and a perforated plate having a multiplicity of apertures through which the auger forces the cheese and from which the particulate mass emerges.

14. The process of claims 1 or 11 wherein the diameter of said particles is about nine-sixteenths or about one-quarter inch.

* * * * *

UNITED STATES PATENT AND TRADEMARK OFFICE
CERTIFICATE OF CORRECTION

PATENT NO. : 4,185,126
DATED : January 22, 1980
INVENTOR(S) : Rodney D. Spors

It is certified that error appears in the above-identified patent and that said Letters Patent are hereby corrected as shown below:

In the specifications:

Column 1 - line 39 "being" should be --are--

Column 1 - line 39 --so-- should be inserted before "are"

Column 1 - line 54 after "cooling" insert --time--

Column 2 - line 11 "is" should be --are--

Column 5 - line 17 "were" should be --was--

Column 5 - line 34 "one hour" should be --thirty minutes--

Signed and Sealed this

Seventeenth Day of June 1980

[SEAL]

Attest:

SIDNEY A. DIAMOND

Attesting Officer

Commissioner of Patents and Trademarks